(12) United States Patent
Schlimgen et al.

(10) Patent No.: US 6,712,599 B2
(45) Date of Patent: Mar. 30, 2004

(54) COMBINATION MOLDING/PUNCHING STATION FOR MOLDING AND PUNCHING CONTAINERS OUT OF A FOIL STRIP OF THERMOPLASTIC SYNTHETIC MATERIAL

(75) Inventors: Stefan Schlimgen, Heilbronn-Böckingen (DE); Michael Firzlaff, Ettlingen (DE)

(73) Assignee: Adolf Illig Maschinenbau GmbH & Co. KG, Heilbronn (DE)

( * ) Notice: Subject to any disclaimer, the term of this patent is extended or adjusted under 35 U.S.C. 154(b) by 98 days.

(21) Appl. No.: 10/034,194

(22) Filed: Jan. 3, 2002

(65) Prior Publication Data

US 2002/0086078 A1 Jul. 4, 2002

(30) Foreign Application Priority Data

Jan. 3, 2001 (DE) .......................... 101 00 119

(51) Int. Cl.[7] .............................. B29C 51/26
(52) U.S. Cl. ............... 425/409; 425/451.4; 425/DIG. 5
(58) Field of Search .............. 425/405.1, 409, 425/441, 451.4, DIG. 5

(56) References Cited

U.S. PATENT DOCUMENTS

| | | |
|---|---|---|
| 3,189,399 A | 6/1965 | Jacobs et al. |
| 3,802,819 A | 4/1974 | Alroy |
| 4,560,339 A | 12/1985 | Padovani |
| 4,565,513 A | 1/1986 | Kiefer |
| 5,975,877 A | 11/1999 | Merklinghaus et al. |
| 6,135,756 A | 10/2000 | Arends |
| 6,558,150 B1 * | 5/2003 | Karbach ................ 425/441 |

FOREIGN PATENT DOCUMENTS

| | | |
|---|---|---|
| DE | 1276900 | 9/1968 |
| DE | 2010260 | 9/1971 |
| DE | 2020472 | 11/1971 |
| DE | 2531236 | 2/1977 |
| DE | 3226841 | 2/1984 |
| DE | 3346628 C2 | 7/1985 |
| DE | 91 08 344.3 | 10/1991 |
| DE | 19710475 A1 | 9/1998 |
| DE | 19921668 C1 | 1/2001 |
| EP | 0947306 | 3/1999 |
| EP | 1025978 | 8/2000 |

* cited by examiner

Primary Examiner—James P. Mackey
Assistant Examiner—Donald Heckenberg
(74) Attorney, Agent, or Firm—Venable LLP; Stuart I. Smith

(57) ABSTRACT

A molding/punching station for molding and punching containers out of a foil strip (2) of thermoplastic synthetic material, which station includes a molding table (5) for holding one half of a mold (4); a frame (9) in which the table (5) is mounted for pivotal movement about a fixed axis of rotation (26) transverse to a longitudinal axis (35) of the table (5); and a single guideway (27) that is mounted on the frame (9) and engages the table (5) for guiding the pivotal motion of the table (5), with the guideway (27) for pivoting table (5) being disposed between the plane of the foil strip (2) in the station and the pivoting point (26') or axis of rotation (26) of the table (5), if necessary with sectional areas of the guideway (27) being opposite the foil strip (2).

20 Claims, 6 Drawing Sheets

COMBINATION MOLDING/PUNCHING STATION FOR MOLDING AND PUNCHING CONTAINERS OUT OF A FOIL STRIP OF THERMOPLASTIC SYNTHETIC MATERIAL

CROSS REFERENCE TO RELATED APPLICATION

This application claims the priority of European Patent Application No. DE 101 00 119.3 filed Jan. 3, 2001, which is incorporated herein by reference.

BACKGROUND OF THE INVENTION

The invention relates to a combination molding/punching station for molding and punching containers out of a foil strip consisting of a thermoplastic synthetic material. More particularly, the present invention relates to a molding/punching station for molding and punching containers out of a foil strip of thermoplastic synthetic material, with the station including a pivoting molding table for holding one of the tool halves, wherein the table is pivoted around a fixed axis of rotation and is guided along a guideway.

According to German reference 199 21 668 A1, the molding table for a combination molding/punching station is guided with a locally fixed rotating joint/sliding joint, and the rotational movement as well as short linear movements in the end positions are realized with a guideway. A pivoting lever engages in the region of the curve rollers and performs the lifting and pivoting movement. With this embodiment and relative to the point of rotation, the guideway is located on the side facing away from the foil strip. Additional guides are necessary to achieve an exact guidance of the tool, as is required in particular for the punching out of the formed containers. Guides are also necessary for maintaining the exact positioning of the molding table, which has been pivoted to a location in front of the stacking table. However, the known guides become effective only in the end positions. Before the end positions are reached, the threat of vibrations exists because the lever ratio between the distances the center of gravity and pivoting point or pivoting point and support by the curve roller changes constantly. The lever ratio becomes increasingly unfavorable during the approach to the end positions of the molding table. Vibrations and force changes of this type result in wear and tear on the positioning and guide parts as well as the drive.

Another disadvantage of this type of design is that no direct cross-connection is possible between the shafts supporting the pivoting levers. An involved synchronizing device must be provided underneath the molding table, which transmits the force to the pivoting levers, arranged on both sides of the molding table, and which synchronizes the movement sequence. Synchronizing devices of this type are very involved and always have some play, so that an identical lift of the molding table on both sides is not a given.

A molding/punching station is known from Canadian Patent Reference No. 2 240 428 A1, which uses three curved paths to achieve a pivoting movement as well as linear movement sequences in the end positions. The expenditure for producing these curved paths, which must be synchronized exactly, is very high. The curve roller diameter is limited because the curved paths or curved path sections will otherwise converge. Nevertheless, narrow regions develop locally between the curved path sections that are sensitive to breakage because high forces act upon these regions via the curve rollers. During the movement along the curved paths, the curve rollers are subjected to a change in direction, which reduces their service life as well as that of the curved path.

SUMMARY OF THE INVENTION

It is the object of the invention to improve the support and guidance of the molding table during its complete pivoting movement while retaining the advantage that the distance between the center of gravity and the pivoting point is initially reduced during the pivoting movement and subsequently increases again toward the end of the movement sequence. The wear and tear of components should be reduced. Both levers for starting the pivoting movement should be arranged on a transversely extending shaft, so that an involved synchronization that involves play can be avoided. The device should have a simple configuration and the guide parts should have a simple design.

The above object generally is achieved according to the present invention by a molding/punching station for molding and punching containers out of a foil strip of thermoplastic synthetic material, which station includes a molding table for holding one half of a mold; a frame in which the table is mounted for pivotal movement about a fixed axis of rotation transverse to a longitudinal axis of the table; and a single guideway, mounted on the frame and engaging the table for guiding the pivotal motion of the table, to the features in claim 1, with the guideway for pivoting table being disposed between the plane of the foil strip in the station and the pivoting point or axis of rotation of the table, if necessary with sectional areas of the guideway being opposite the foil strip. With this type of arrangement, an effective guidance of the molding table, which can be pivoted, is always possible at a favorable location.

Different embodiments of the molding/punching station are described in further detail with the aid of the schematic drawings.

DESCRIPTION OF THE PREFERRED EMBODIMENTS

Figure 1:
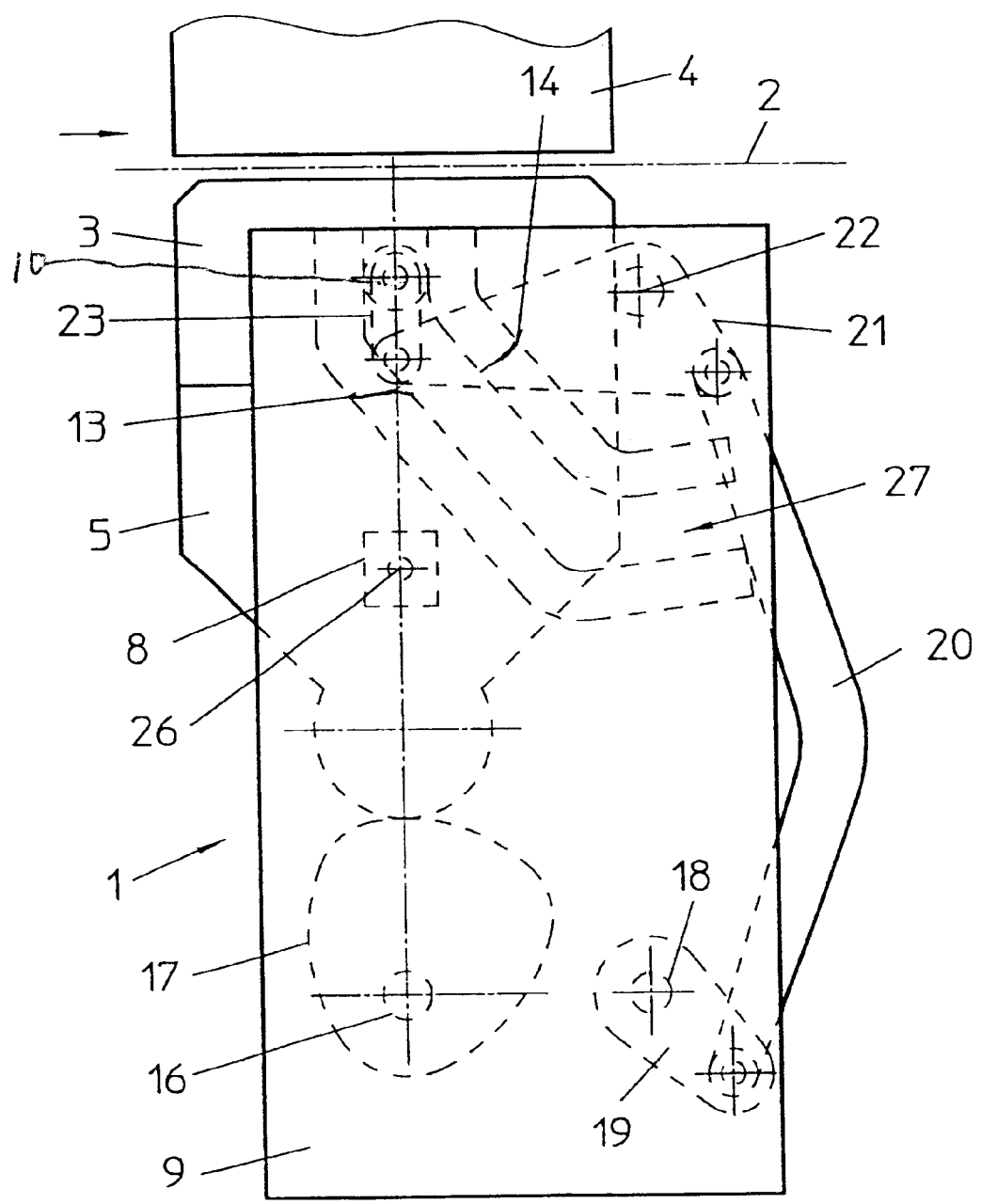
FIGS. 1 and 2 are views from the side of the molding/punching station according to the invention in two positions.
Figure 2:
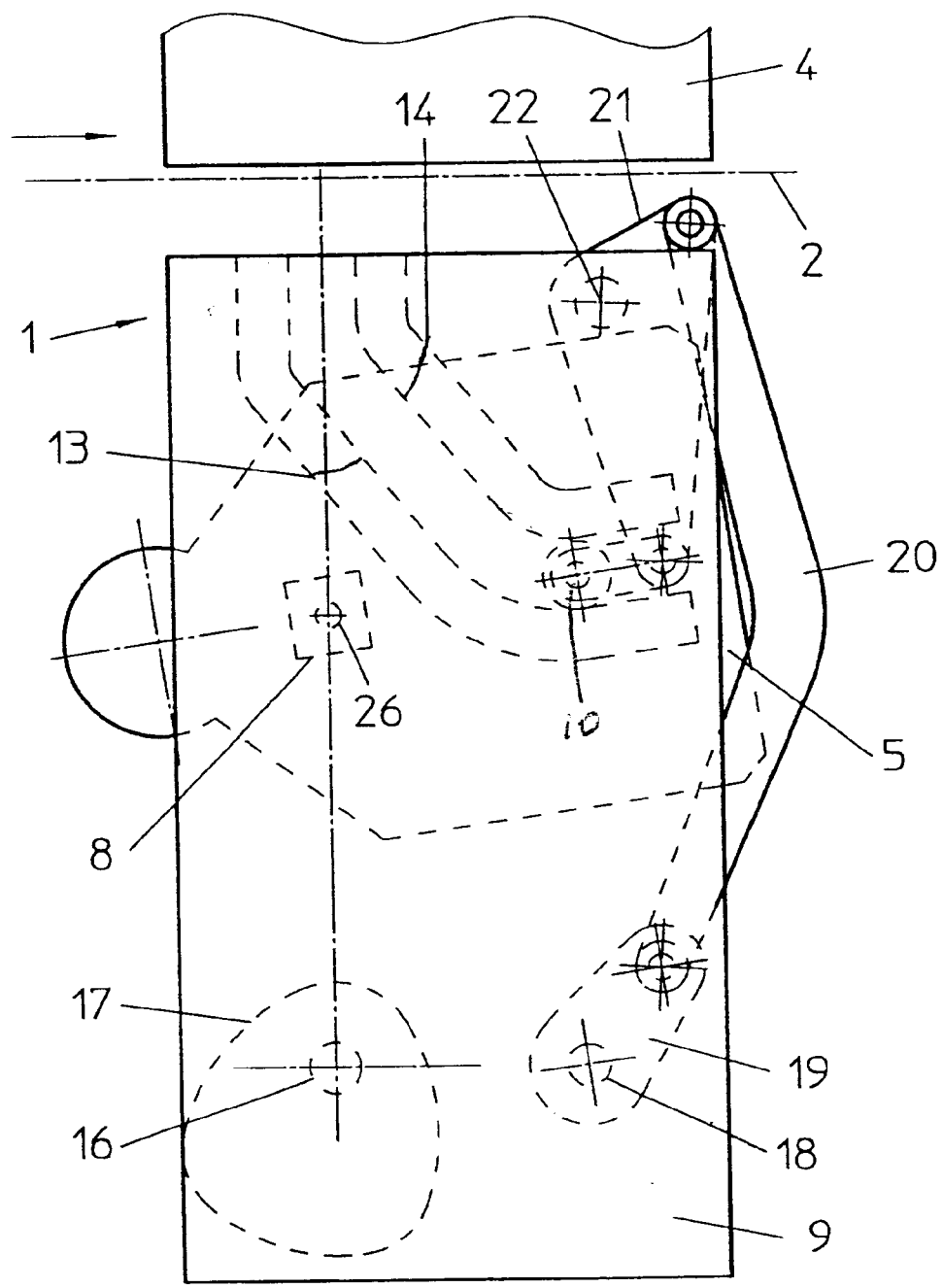
Figure 3:
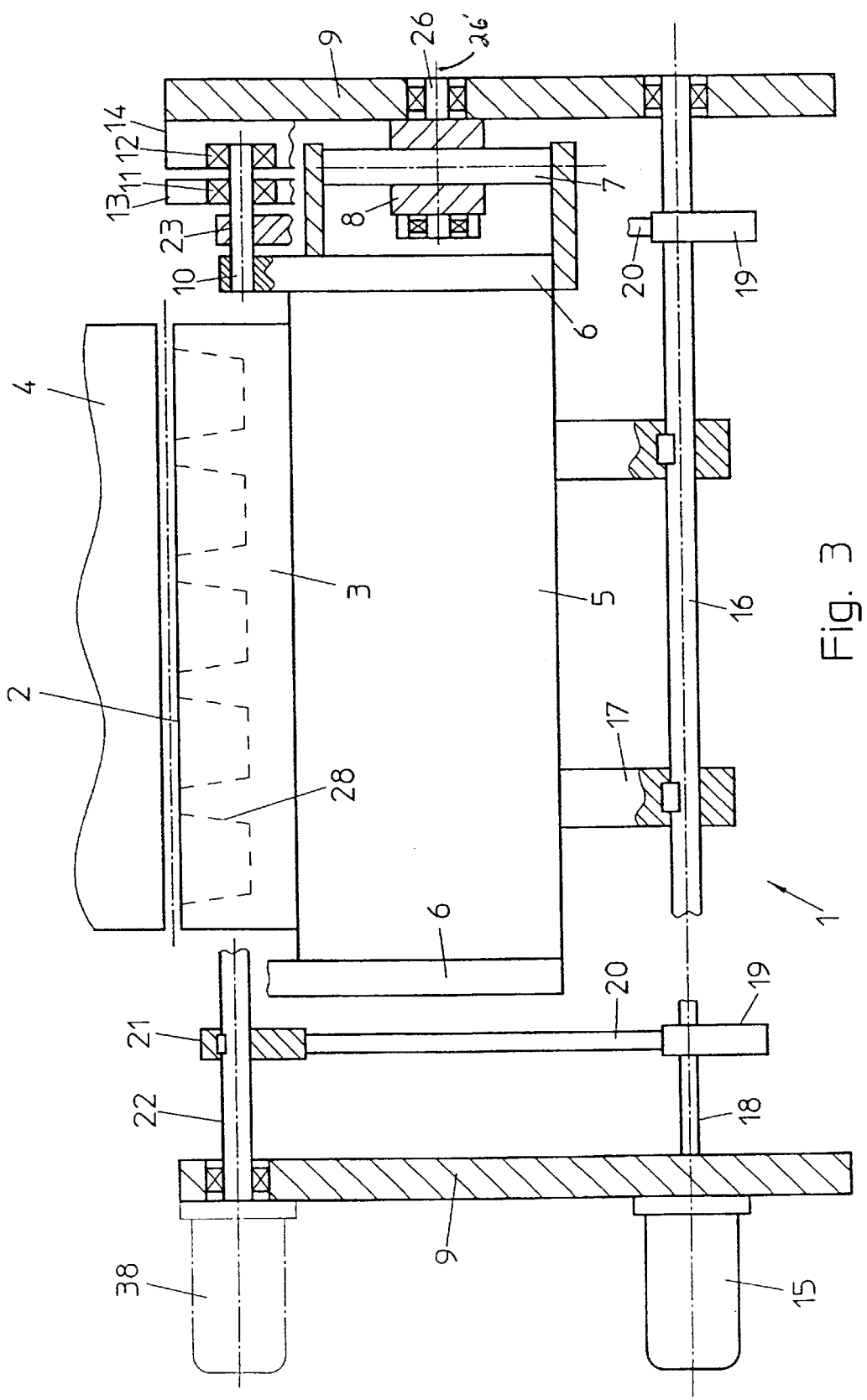
FIG. 3 is a cross sectional view through the molding/punching station.

Referring now to FIGS. 1–3, the combination molding/punching station 1 represents a part of a thermal molding machine, which comprises, in addition to a heating device, a conveying device (not shown) for the intermittent transport of a foil strip 2. Sectional areas of this foil strip 2 reach the molding/punching station 1 and, in a known manner, are deep-drawn with the aid of the two tool halves 3, 4 to form containers 28. The containers 28 are punched out as a result of a slight closing movement by the two tool halves 3, 4, following the molding operation. One tool half 4 with molding components is attached to a molding table 5, which can be displaced in height and can be pivoted from a vertical first position opposite the tool half 3 as shown in FIG. 1, to a second almost horizontal position as shown in FIG. 2 wherein the tool half 4 faces a further station (not shown in these Figures, e.g., a stacking station. For this purpose, and as can be seen from FIG. 3, the molding table 5 is provided with two support plates 6, one on each side with only one plate 6 being completely shown in FIG. 3. On each support plate 6, a respective guide 7 is mounted, which guide is designed as a round guide or a flat guide. Each of the guides 7 slides inside a respective rotating/sliding joint 8, which is positioned such that it is locally secured to a frame 9 by a bearing 26 for rotation around a rotation axis 26 extending transverse to the longitudinal axis 35 (FIG. 8) of the table 5.

To guide the pivoting movement of the table 5 about the rotational axis 26', a guideway 27 is provided on the frame 9 and has a guide surface between the location of the bearing 26 and thus the rotational axis 26', of the rotating/sliding joint 8 and the plane of the foil strip 2, which plane is perpendicular to the longitudinal axis 35 when the table 5 is in the position shown in FIG. 1. Depending on the geometric conditions, it may be advantageous or necessary for an upper partial region of guideway 27 to extend along the side of the frame 9 opposite the foil strip 2. In that case, frame 9 is extended upward past the plane of the foil 2.

Figure 5:
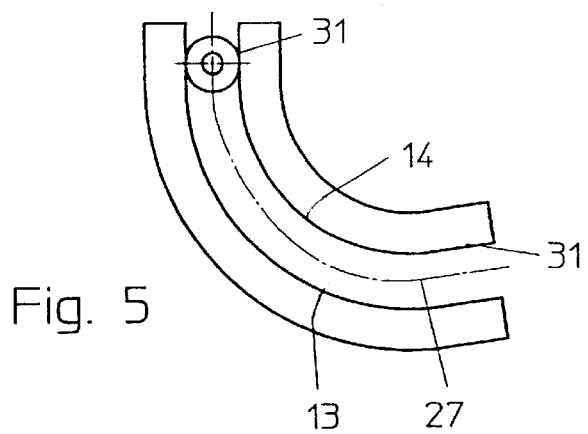
FIGS. 5 and 6 show two different designs for the guideway.
Figure 6:
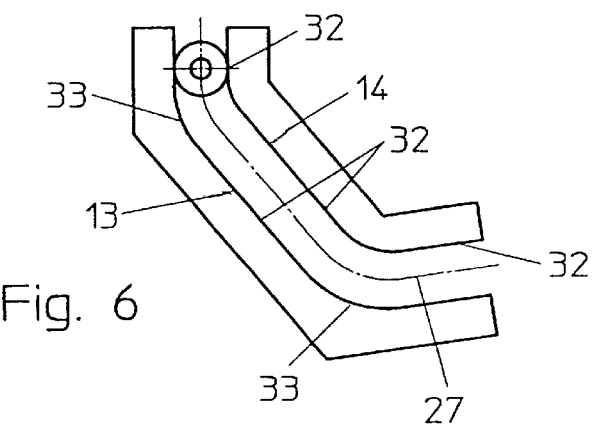
Figure 7:
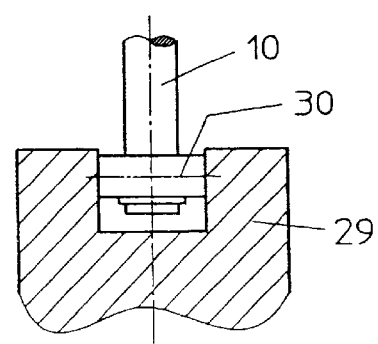
FIG. 7 is a sectional cut through a cam with a groove.

Additionally, a respective peg 10 is mounted on each carrier plate 6 so that it extends perpendicular to the longitudinal axis 35 generally parallel to the axis of rotation 28 and supports either a single curve roller 30 (See FIG. 7) that is supported in a cam groove 29 that forms the guideway 27, or preferably two curve rollers 11, 12 that are supported on the respective curved paths 13, 14 (see FIGS. 5, 6). If only one curve roller 30 that moves inside a cam groove 29 is provided, it has the disadvantage of a possible change in rotational direction for the curve roller 30 during the pivoting movement, which results in increased wear and tear. Thus, it is more advantageous to have a divided design for the guideway 27, in the form of two curved paths 13, 14 with unambiguous rotational direction for the associated curve roller 11, 12. Each peg 10 is acted upon by a lever or connecting member, which starts the pivoting movement of the molding table 5.

Various designs and operating modes exist for the lever or connecting member, as well as different designs for the guideway 27, which will be discussed further in the following. One joint feature for all embodiments is a transverse shaft 16 that is rotatably mounted into the frame 9, and having cam disks 17 attached thereto, which disks support the molding table 5 in the upward pivoted direction as shown in FIG. 1 and cause the displacement in height to perform the punching-out movement.

The drive for pivoting the molding table 5 shown in FIGS. 1 and 2 is such that a respective lever 19 is mounted on each side of the table on a transverse rotary shaft 18 that is driven via a motor 15. An arm 20 is articulated to the lever 19 such that the arm can rotate on this lever and is also pivotally articulated to the respective lever 21. Both levers 21 are positioned immovably on the transverse shaft 22 for rotation therewith and support a respective connecting member 23 that can be pivoted relative to the respective lever 21 and is positioned so as to rotate on the respective peg 10. By turning the transverse shaft 18, the pegs 10 are caused to move along the guide path 27 and the molding table 5 is moved between the two end positions, as shown in FIGS. 1 and 2 respectively.

Figure 4:
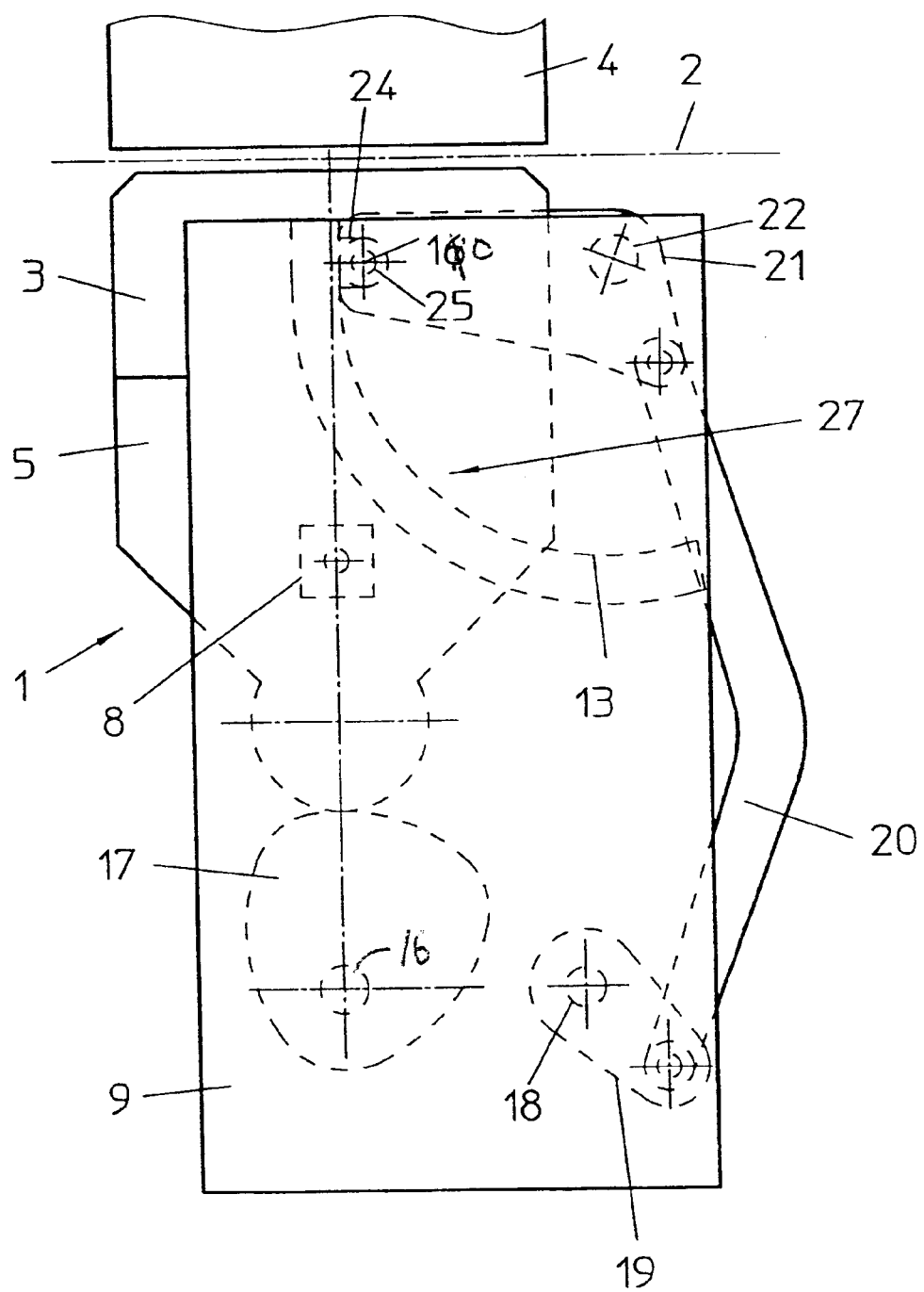
FIG. 4 is a view from the side of the molding/punching station with a modified drive.

The connecting member 23 can be omitted if the associated lever 21 is provided with a fork-shaped recess 24, as shown in FIG. 4, which acts directly upon the peg 10 or a curve roller 25 arranged thereon. With this design, it is possible to have only one curved path 13 (See FIG. 4) with a circular design.

With the modified drive shown in FIGS. 1 and 2, different designs are possible for the curved paths 13, 14, e.g., circular (FIG. 5) with straight discharge or end portions 31, or with three straight portions 32 having radial transitions 33 (FIG. 6). These designs can be produced relatively easily and combinations are possible as well.

The embodiment of guideway 27 according to FIGS. 5 and 6 influences the speeds, accelerations and forces acting upon the components in question during the pivoting movement. Depending on the geometric design, these values—as well as the width of the tool—can be optimized. The transverse shaft 22 is arranged outside of the molding table 5, such that it does not collide with this table during the pivoting operation. The shape of these curved paths 13, 14 is also selected accordingly to prevent this collision.

Figure 8:
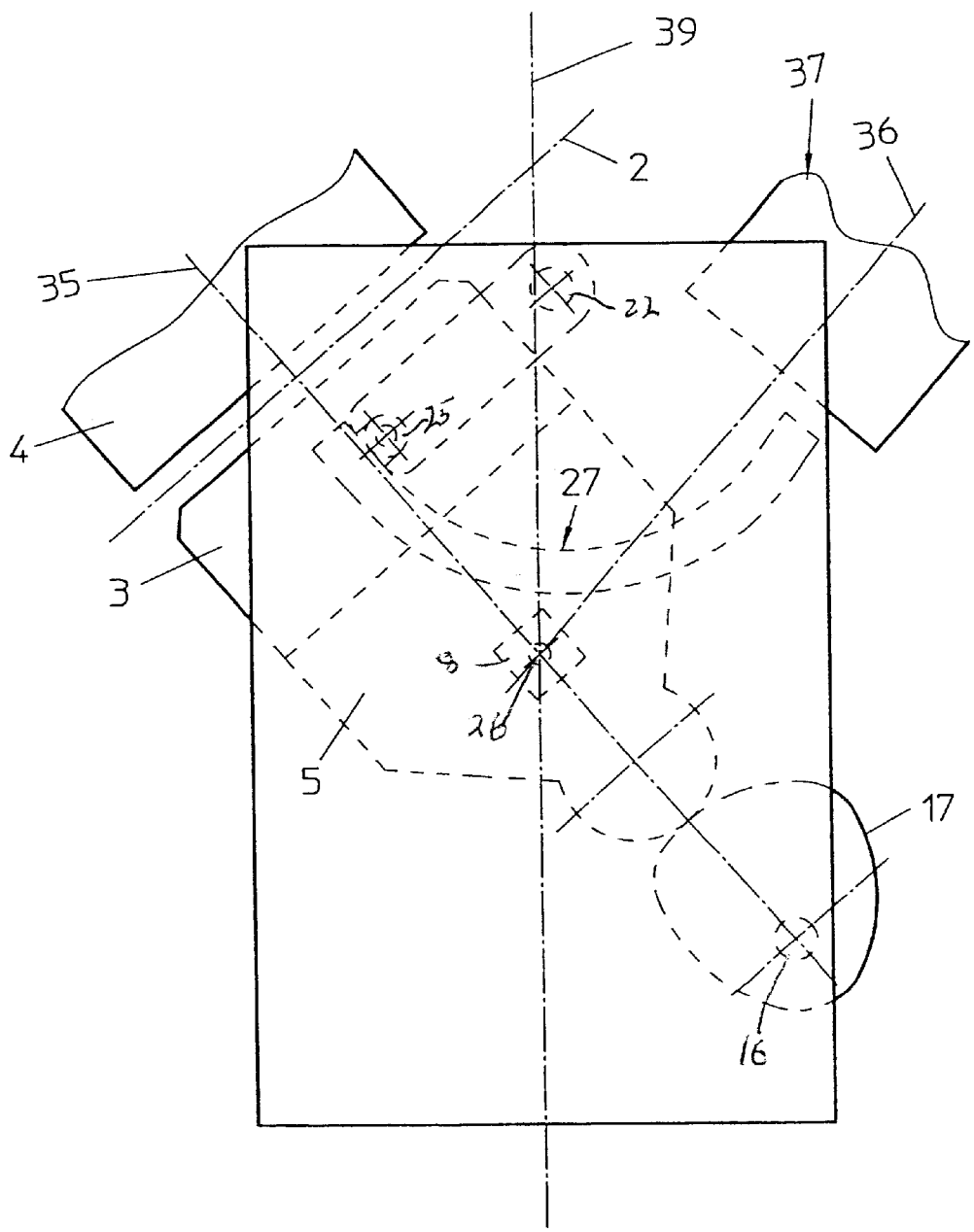
FIG. 8 shows a modified embodiment of the molding/punching station.

FIG. 8 shows a design option for the molding/punching station, which offers kinematic advantages. The longitudinal symmetry axis 35 of the molding/punching station 1 is arranged at an angle to the vertical line 39. The symmetry axis 36 of a stacking device 37 disposed horizontally to the side of the molding/punching station is also arranged at an angle, preferably the same angle as the axis 35, to the vertical line 39. In this way, the gravitational force of molding table 5 has the effect of accelerating the lowering movement of the table toward the illustrated position, meaning it saves energy with respect to the drive energy that must be used. During the other part of the pivoting movement in the direction of the stacking device or station 37, the molding table 5 is raised, so that its momentum is slowed down and less energy is required for the braking operation. A type of pendulum movement is created. It is this design in particular, which permits a direct operation of the transverse shaft 22, as is indicated in FIG. 3 in the form of drive 38. The drive 38 is preferably designed as a servomotor, thus making it possible to omit the components 18, 19 and 20 and resulting in a more cost-effective solution. The direct drive in principle can be used with all embodiments shown.

The invention now being fully described, it will be apparent to one of ordinary skill in the art that many changes and modifications can be made thereto without departing from the spirit or scope of the invention as set forth herein.

What is claimed is:

1. A molding/punching station for molding and punching containers out of a foil strip of thermoplastic synthetic material, said station including a molding table for holding one half of a mold; a support frame in which the table is mounted, via a combination rotating/sliding joint, for sliding movement and for pivotal movement around a fixed axis of rotation transverse to the longitudinal axis of the table; and a single guideway mounted on the frame and engaging the table for guiding the sliding movement and the pivotal movement of the table, with the guideway being disposed between the axis of rotation and a plane containing the foil strip in the molding/punching station.

2. A molding/punching station according to claim 1, wherein the guideway engages the table via a peg mounted on a side of the table, and extending parallel to the axis of rotation.

3. A molding/punching station according to claim 1, wherein the guideway is a single groove engaged by one cam roller mounted on the table or two curved paths with straight areas with radial transitions engaged by respective rollers mounted on the table.

4. A molding/punching station according to claim 1, wherein the guideway is a single groove engaged by a single cam roller mounted on the table or two curved paths of a circular design with straight discharge portions that are engaged by respective rollers mounted on the table.

5. A molding/punching station according to claim 1, further comprising means for pivoting the table about the axis of rotation comprising at least one driven lever that acts one of directly or via an intermediate connecting member upon the table and that is rigidly mounted on a transverse shaft rotatably mounted on the frame.

6. A molding/punching station according to claim 5, wherein the at least one lever is pivoted via a respective guide arm, which is articulated to a pivoting lever fixedly arranged on a further driven transverse shaft mounted for rotation in the frame.

7. A molding/punching station according to claim 5, further comprising a drive directly connected to the transverse shaft for directly rotating the shaft to pivot the lever fixedly arranged thereon.

8. A molding/punching station according to claim 7, wherein the drive is a servomotor.

9. A molding/punching station according to claim 1, wherein the guideway is formed with a single curved path with a circular design, and the pivoting movement of the molding table is realized in that the at least one pivoting lever is provided with a slot-type recess that engages a respective transversely extending peg arranged on the table.

10. A molding/punching station according to claim 9, further comprising a drive which directly drives the transverse shaft to provide the pivoting movement of the lever.

11. A molding/punching station according to claim 1, wherein a stacking device is positioned adjacent the molding/punching station to cooperate with the mold half on the table when the mold is open and the table is pivoted about the axis of rotation toward the stacking device, and a longitudinal symmetry axis of the table and a longitudinal symmetry axis for the stacking device are both arranged at an angle to a vertical line.

12. A molding/punching station according to claim 11, wherein the two longitudinal symmetry axes are both inclined by the same angle to the vertical line.

13. A combination molding/punching station for molding and punching containers out of a foil strip of a thermoplastic synthetic material, said station comprising: a pivoting molding table for holding one mold half, with said table being mounted in a locally fixed frame to pivot around a fixed pivoting point, and for sliding displacement relative to the fixed pivoting point; a respective single guideway, arranged on either side of the molding table on the fixed frame, and engaging the table for guiding the sliding displacement and the pivoting movement of the table; the pivoting point on each side of the molding table is a combination rotating/sliding joint that is mounted on the locally fixed frame for rotation about an axis of rotation transverse to a longitudinal axis of the table; and each single guideway is arranged between a respective pivoting point and an upper edge of the mold half, as seen in a closed state of the molding table.

14. The combination molding/punching station according to claim 13, wherein the guideways extend past an upper edge of the one mold half, in a direction of the other mold half.

15. The combination molding/punching station according to claim 13, wherein each guideway is formed by either a cam groove or two curved paths, with straight sections, and radial transitions.

16. The combination molding/punching station according to claim 13, wherein each guideway is formed by a cam groove or two curved paths, with a circular shape having straight discharge portions.

17. The combination molding/punching station according to claim 13, further comprising driven levers provided for pivoting the molding table, with the driven levers being mounted on and connected to a transverse shaft and acting directly or via an intermediate lever upon the table.

18. The combination molding/punching station according to claim 17, wherein the levers are pivoted with the aid of guide arms that are connected to pivoting levers arranged on a driven transverse shaft.

19. The combination molding/punching station according to claim 17, wherein a drive which drives the transverse shaft is provided for pivoting the levers.

20. The combination molding/punching station according to claim 1, wherein each guideway is formed by a single curved path having a circular shape and a respective pivoting lever that is provided with a slotted recess that engages in a respective pivot pin on the table and moves the pin along the guideway to pivot the molding table.

* * * * *